April 22, 1952 A. R. BURCHSTED 2,593,841
LUBRICATING APPARATUS
Filed Aug. 12, 1949
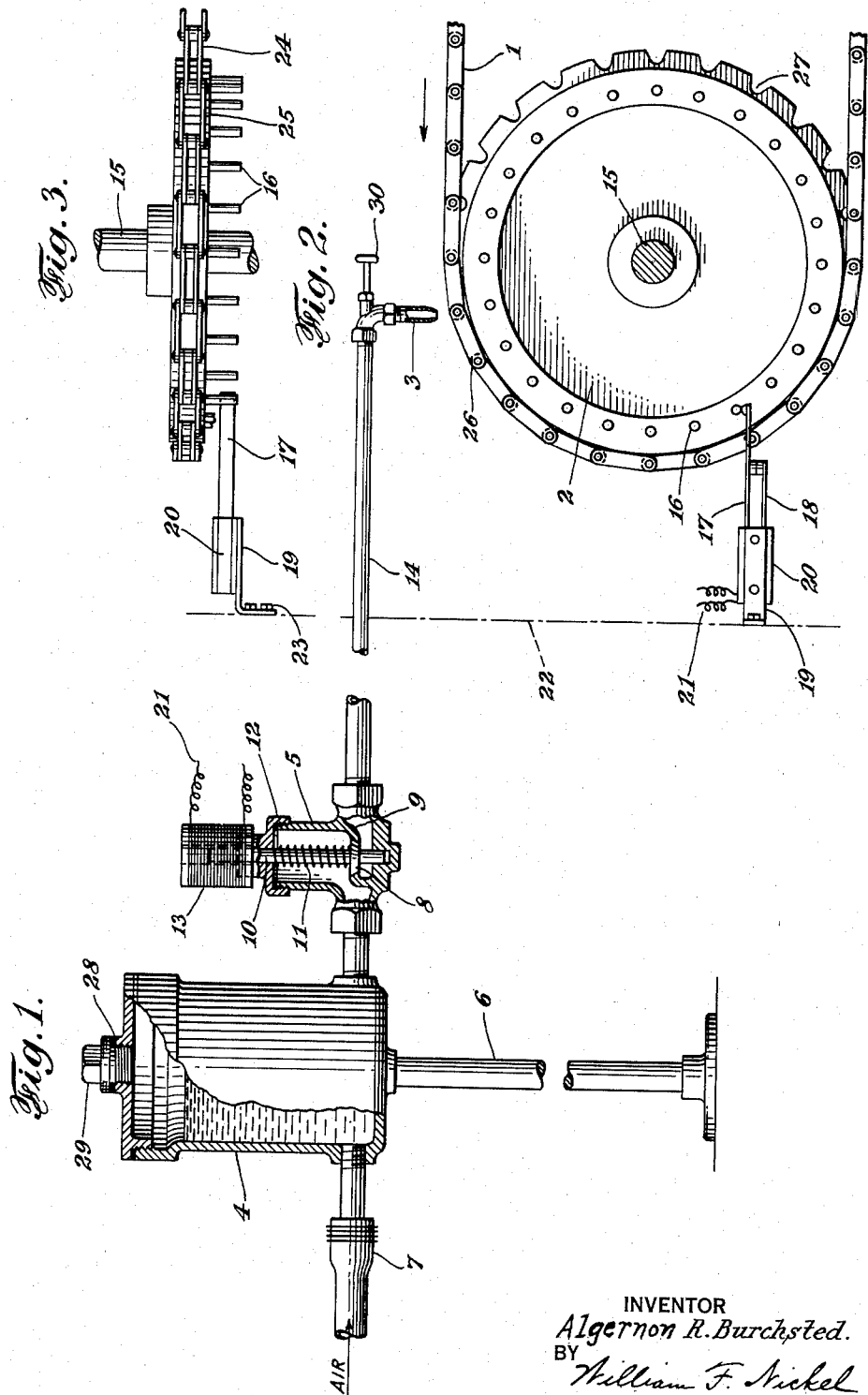
INVENTOR
*Algernon R. Burchsted.*
BY
*William F. Nickel*
ATTORNEY Patented Apr. 22, 1952

2,593,841

UNITED STATES PATENT OFFICE 2,593,841

LUBRICATING APPARATUS

Algernon R. Burchsted, Ridgewood, N. J.

Application August 12, 1949, Serial No. 109,923

4 Claims. (Cl. 184—15)

This invention is an improvement in lubricating apparatus, especially lubricating apparatus for endless chains running on sprocket wheels.

As is well known, such chains are made of flat links connected in pairs by pins at their ends with a space between the links of each pair. It is an important object of my invention to provide apparatus which will supply lubricant to such a chain at the successive junctions of the links while the chain is in motion, to keep the chain in the best operative condition.

To this end, the lubricating apparatus of my invention comprises a reservoir containing the lubricant and a nozzle for discharging the lubricant upon the chain; together with a timing device to control the nozzle and ensure the delivery of the lubricant at each instant when a point of junction of the links comes into position adjacent the nozzle to receive the lubricant.

The nature and advantages of the invention are fully described hereinafter and the novel characteristics are defined in the appended claims.

The drawings illustrate a preferred embodiment of the improvement, but alterations may be made in shape, size and arrangement of parts and other structural details without deviating from the general principle of the apparatus.

On the drawings:

Figure 1 is a side elevation showing the reservoir for the lubricant and the regulating valve therefor at one end of the apparatus.

Figure 2 is a similar view of the other end with the delivery nozzle and the timing mechanism; and Figure 3 is a top plan of what is shown on Figure 2.

The endless chain to be treated is shown at 1. It is supported at both ends by sprocket wheels, one of which is indicated at 2. It receives lubricant from the discharge nozzle 3, which is connected to the reservoir 4. Between the nozzle 3 and the reservoir 4 is a casing 5 enclosing a valve periodically actuated to permit the required quantity of lubricant to be expelled from the nozzle upon the chain 1. The reservoir is supported upon a leg 6 or in any other suitable manner and is connected to a conduit 7 leading from a source of compressed air, in position to admit air under pressure to the reservoir at the lower part of the reservoir. The lubricant is in a semi-liquid state and preferably contains graphite or the like material. Some of the air escapes every time lubricant is emptied from the nozzle 3, but the air pressure in the reservoir is kept constant by more air entering through the pipe 7. The air comes in near the bottom of the reservoir and of course rises, bubbling through the lubricant and agitating it. The proper dispersion of the ingredients of the lubricant is thus maintained.

The valve 8 in the casing 5 normally rests against a seat in a web 9. It has a stem 10 surrounded by a compression spring 11 abutting the head of the valve and the screw cap 12 on the casing 5. The stem 10 projects through the cap on the casing into a solenoid coil 13. When this coil is energized, the stem is pulled upward against the force of the spring 11 and the valve 8 opens. The casing 5 is connected to the nozzle 3 by an outlet conduit or pipe 14.

The rotary member or sprocket gear 2 is mounted on a shaft or journal 15 and has studs 16 projecting from one of its faces. These studs are spaced equidistantly apart; and when the chain runs and the wheel rotates, the studs successively engage a switch having a flexible spring metal terminal 17 and force it into momentary contact with another metal blade 18. These terminals are in circuit with a source of electric energy, not shown, and the solenoid 13. The switch members 17 and 18 are supported on a bracket 19 and are separated by insulation 20. The terminals 17 and 18 are joined to the solenoid by conductors 21, in the circuit of which is a source of electricity not shown, and the bracket 19 is affixed to a wall or other support 22 by fastening elements such as nails or screws 23. The links of the chain are indicated at 24 and 25, joined at their ends by pins 26. In the rim of the sprocket 2 are recesses or notches 27 which are spaced apart as far as the pins 26; and the studs 16 on the gear 2 are separated by the like distance. The reservoir 4 has an opening 28 in the top wth a closure plug 29, and on the nozzle 3 is a needle valve or metering pin which can be set to regulate the outflow by a knob 30 on its outer end.

In operation, whenever one of the studs 16 forces the blade 17 to make contact with the terminal 18, the electric circuit is closed through the wires 21, and the solenoid coil 13 pulls the stem 10 to open the valve 11. The pressure in the reservoir 4 now forces lubricant out of the nozzle 3. The position of the nozzle with respect to the chain 1 and the motion thereof is such that, whenever lubricant is discharged, it drops upon one of the pins 26 connecting the links 24 and 25. The nozzle can be mounted so as to be adjustable, so that it can be maintained in the exact position necessary to give this result. It can also be constructed to have two outlet openings, if desired, one over each side of the chain, so that both ends of the pins 26 can be adequately supplied as long as the chain is running. The driving power can be exerted on the sprocket gear at either end. The invention is therefore quite useful for chains that drive machinery, or are parts of conveyors, or are otherwise utilized. The apparatus is simple, inexpensive to manufacture and operate; and quite certain in its working under all conditions of use.

Having described my invention, what I believe to be new is:

1. Lubricating apparatus comprising a reservoir, a nozzle coupled to the reservoir, a normally closed valve between the reservoir and the nozzle, and means comprising a rotatable member adjacent the nozzle for periodically opening said valve, said reservoir having a conduit connected to the lower part thereof to admit compressed air to agitate the contents and maintain a pressure thereon.

2. Lubricating apparatus comprising a reservoir, a nozzle coupled to the reservoir, a normally closed valve between the nozzle and the reservoir, means comprising a rotary member adjacent the nozzle for periodically opening said valve, and means for directing a force on the contents of the reservoir to expel the contents from the nozzle, said last-named means comprising a conduit connected to the lower part of the reservoir to admit compressed air to agitate the contents and maintain a pressure thereon.

3. Lubricating apparatus comprising a reservoir, a nozzle coupled thereto, a normally closed valve between the reservoir and the nozzle, a solenoid for opening the valve, a switch for opening and closing an electric circuit, and means comprising a rotary member adjacent the nozzle for periodically closing the switch to energize the solenoid and open the valve, said reservoir having a connection adjacent its lower part to admit compressed air into the reservoir.

4. Lubricating apparatus comprising a reservoir, a nozzle coupled thereto, a normally closed valve between the reservoir and the nozzle, a solenoid for opening the valve, a switch for opening and closing an electric circuit, and means comprising a rotary member adjacent the nozzle for periodically closing the switch to energize the solenoid and open the valve, said reservoir having a connection adjacent its lower part to admit compressed air into the reservoir, said member having projections adjacent the circumference at equal distances apart to engage said switch.

ALGERNON R. BURCHSTED.

REFERENCES CITED

The following references are of record in the file of this patent:

UNITED STATES PATENTS

| Number | Name | Date |
|---|---|---|
| 651,381 | Peters | June 12, 1900 |
| 849,345 | Klemm | Jan. 1, 1907 |
| 1,105,929 | Schultheis | Aug. 4, 1914 |